US011784450B2

United States Patent
Rzasa et al.

(10) Patent No.: US 11,784,450 B2
(45) Date of Patent: Oct. 10, 2023

(54) LASER GUIDED TOOLS

(71) Applicant: Hubbell Incorporated, Shelton, CT (US)

(72) Inventors: Michael Paul Rzasa, Nashua, NH (US); Jennifer Peterson, Pflugerville, TX (US)

(*) Notice: Subject to any disclaimer, the term of this patent is extended or adjusted under 35 U.S.C. 154(b) by 0 days.

(21) Appl. No.: 17/971,716

(22) Filed: Oct. 24, 2022

(65) Prior Publication Data

US 2023/0038877 A1   Feb. 9, 2023

Related U.S. Application Data

(63) Continuation of application No. 16/839,765, filed on Apr. 3, 2020, now Pat. No. 11,482,825, which is a continuation of application No. 15/248,672, filed on Aug. 26, 2016, now Pat. No. 10,630,036.

(60) Provisional application No. 62/210,581, filed on Aug. 27, 2015.

(51) Int. Cl.
| | |
|---|---|
| *B25B 27/10* | (2006.01) |
| *H01R 43/042* | (2006.01) |
| *B26D 1/06* | (2006.01) |
| *B25B 27/14* | (2006.01) |
| *B25F 5/02* | (2006.01) |
| *B23D 29/00* | (2006.01) |
| *B23D 33/12* | (2006.01) |
| *B26D 5/06* | (2006.01) |

(52) U.S. Cl.
CPC ........ *H01R 43/0428* (2013.01); *B25B 27/10* (2013.01); *B25B 27/146* (2013.01); *B25F 5/021* (2013.01); *B26D 1/06* (2013.01); *B23D 29/002* (2013.01); *B23D 33/12* (2013.01); *B26D 5/06* (2013.01)

(58) Field of Classification Search
CPC ... H01R 43/0428; B25B 27/00; B25B 27/304; B26D 1/06; B23D 33/12
See application file for complete search history.

(56) References Cited

U.S. PATENT DOCUMENTS

| | | | | |
|---|---|---|---|---|
| 5,291,772 | A * | 3/1994 | Ferraro | H01R 43/042 |
| | | | | 72/476 |
| 10,630,036 | B2 * | 4/2020 | Rzasa | H01R 43/0428 |
| 11,482,825 | B2 * | 10/2022 | Rzasa | B25F 5/021 |
| 2007/0019400 | A1 * | 1/2007 | Clausen | B25G 1/102 |
| | | | | 362/109 |
| 2008/0282762 | A1 * | 11/2008 | Rzasa | H01R 43/0427 |
| | | | | 29/592 |
| 2017/0063014 | A1 * | 3/2017 | Rzasa | B26D 1/06 |
| 2020/0235541 | A1 * | 7/2020 | Rzasa | B25B 27/146 |

* cited by examiner

Primary Examiner — Lee D Wilson
(74) Attorney, Agent, or Firm — Wissing Miller LLP

(57) ABSTRACT

Tools for crimping or cutting of an object such as a wire, cable, or connector. The tool includes a first member and a second member configured to come together through a gap to crimp or cut a wire, cable or connector and a laser positioned to visually indicate a region where at least one member traverses as the first and second member come together through the gap. This visual indication aids in alignment of the object for the crimping or cutting operation.

20 Claims, 7 Drawing Sheets

LASER GUIDED TOOLS

CROSS REFERENCE TO RELATED APPLICATIONS

The present disclosure is a continuation of co-pending U.S. application Ser. No. 16/839,765 filed Apr. 3, 2020, which is a continuation of U.S. application Ser. No. 15/248,672 filed Aug. 26, 2016 (now U.S. Pat. No. 10,630,036), which claims benefit from U.S. Provisional Application No. 62/210,581 filed Aug. 27, 2015, the entire contents of each are herein incorporated by reference.

BACKGROUND

Field

This disclosure relates generally to the field of crimping and cutting tools. More particularly, this disclosure relates to laser-guided crimping and cutting tools.

Description of the Related Art

A crimping tool is used to crush a sleeve of an electrical connector around a wire or cable to secure the connector to the wire or cable and make an electrical connection between the connector and the wire or cable. A cutter tool is used to cut wires and cables.

Some crimping tools are manually operated by squeezing the handles of the tool to cause members of the crimping tool to apply a force on the connector over the wire or cable. This force is designed to crush the connector sleeve around the wire or cable to secure the connector sleeve to the wire or cable. Similarly, cutting tools are manually operated by squeezing the handles of the tool to cause members of the cutting tool to apply a cutting force on the wire or cable.

Other crimping and cutting tools are operated using power from a power supply. Generally powered crimping and cutting tools are used to operate on heavier gauge wires and cables.

Typically, a user manually holds an object in a position relative to the members so that the object may be operated on by the tool. Because the user may desire that the crimping or cutting operation happens in a specific location of the object, the user may tend to hold the object close to the location where the crimping or cutting operation occurs. This may expose users to injury if their fingers are caught in the path of the crimping or cutting members.

If the user holds the object further from the operation there may be more positioning variability relative to the members thereby leading to crimping and cutting errors.

It is desirable to be able to use crimping and cutting tools to more safely and accurately perform crimping and cutting operations.

SUMMARY

Embodiments of the disclosure include illustrative embodiments of tools for crimping connectors around wires and cables, cutting wires and cables, and a method for performing crimping and cutting operations. Other embodiments perform other mechanical operations on an object.

Embodiments include a tool for operating on an object, such as a connector, wire or cable. The tool includes a body and a head. The tool head includes a first member and a second member configured to converge around the object when the tool is operated. The tool head also includes a light source positioned to generate light that visually indicates a region where at least one member traverses as the first member and the second member converge.

In some embodiments the operation crimps a connector to a wire or cable. In other embodiments, the operation cuts a wire or cable. In yet other embodiments, other mechanical operations may be performed on a wire, cable, or other object.

In some embodiments the light source is a laser positioned to visually indicate where the tool will operate on the object as the first and second members converge.

In some embodiments, the laser illuminates a plane between the members such that the object will be illuminated where it crosses the plane. In other embodiments the laser illuminates a portion of the path in which at least one of the members traverses such that the object will be illuminated where it crosses the illuminated portion of the path.

The illumination on the object provides a visual indication where the members will operate on the object. A user can adjust the position of the object or the tool relative to each other based on the visual indication before performing the crimping operation.

In some embodiments, at least one of the members has at least one feature that operates on the object. In some cases, the features may be removably attached to the members. For example, crimping dies may be attached to each of the members to attach features for particular sizes of connectors, wires or cables. In other embodiments, one or more features may be fixed on the member.

A feature of a member of the crimping tool may be a protrusion groove of other physical structure that defines how the member physically interacts with the connector to secure it to the wire or cable. The laser may be positioned to specifically indicate the path of a feature as the members converge around the object. Thus, the physical impact of that feature can be anticipated by aligning the laser to a target area of the object.

A feature of a member of the cutting tool may be a blade that cuts the wire or cable. The laser may be positioned to specifically indicate the path of at least one of the blades as the members converge around the object. Thus, the physical impact of the blade can be anticipated by aligning the laser to a target area of the object.

In some embodiments, the tool is manually operated even though the laser is powered by a battery or other power source.

Reference in this specification to "one embodiment," "an embodiment" or the like means that a particular feature, structure, characteristic, advantage or benefit described in connection with the embodiment may be included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the spirit and scope as set forth in the claims.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description.

Figure 1:
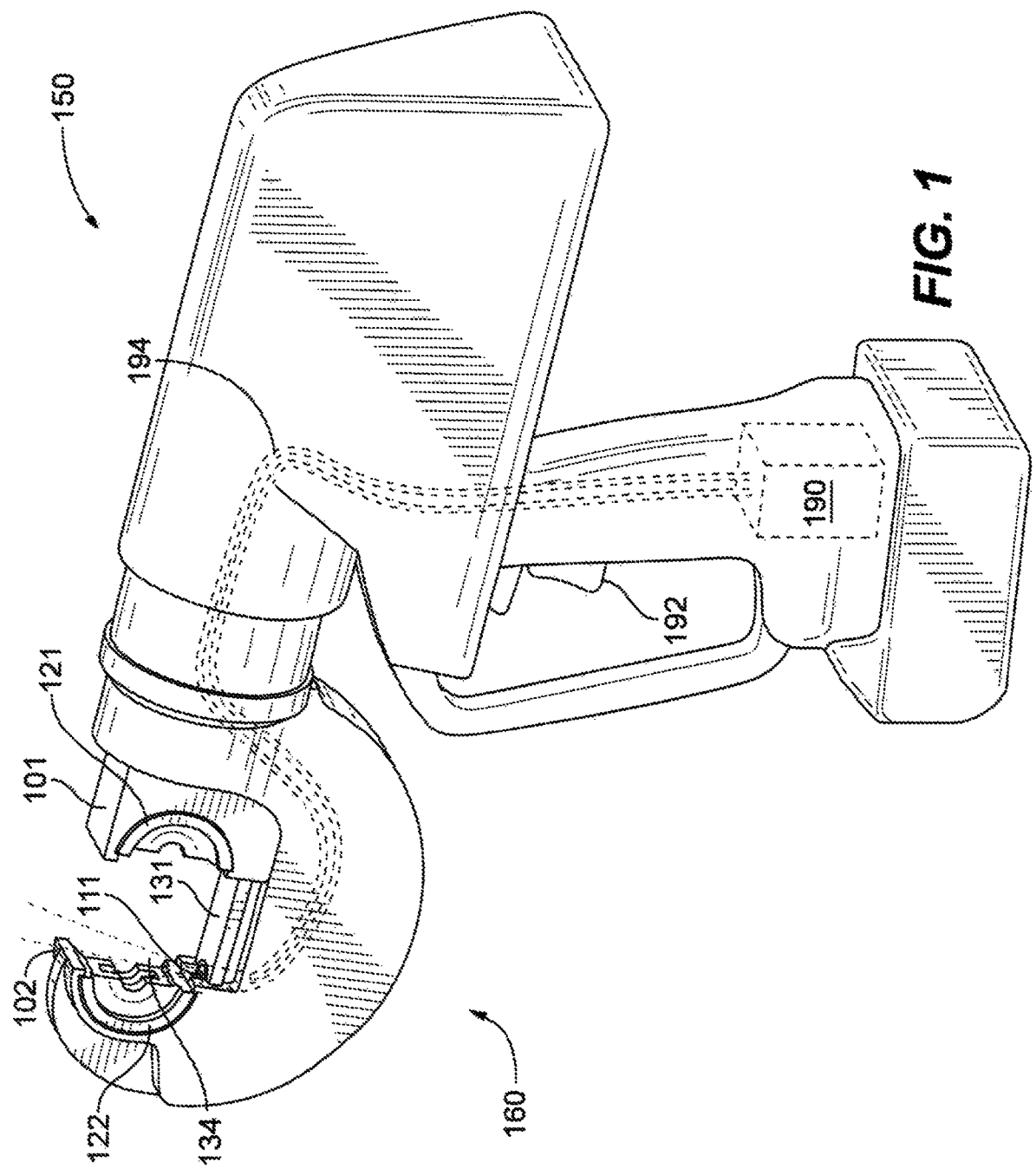
FIG. 1 is a perspective view of a first embodiment of a tool for performing a crimping operation on a connector.
Figure 2:
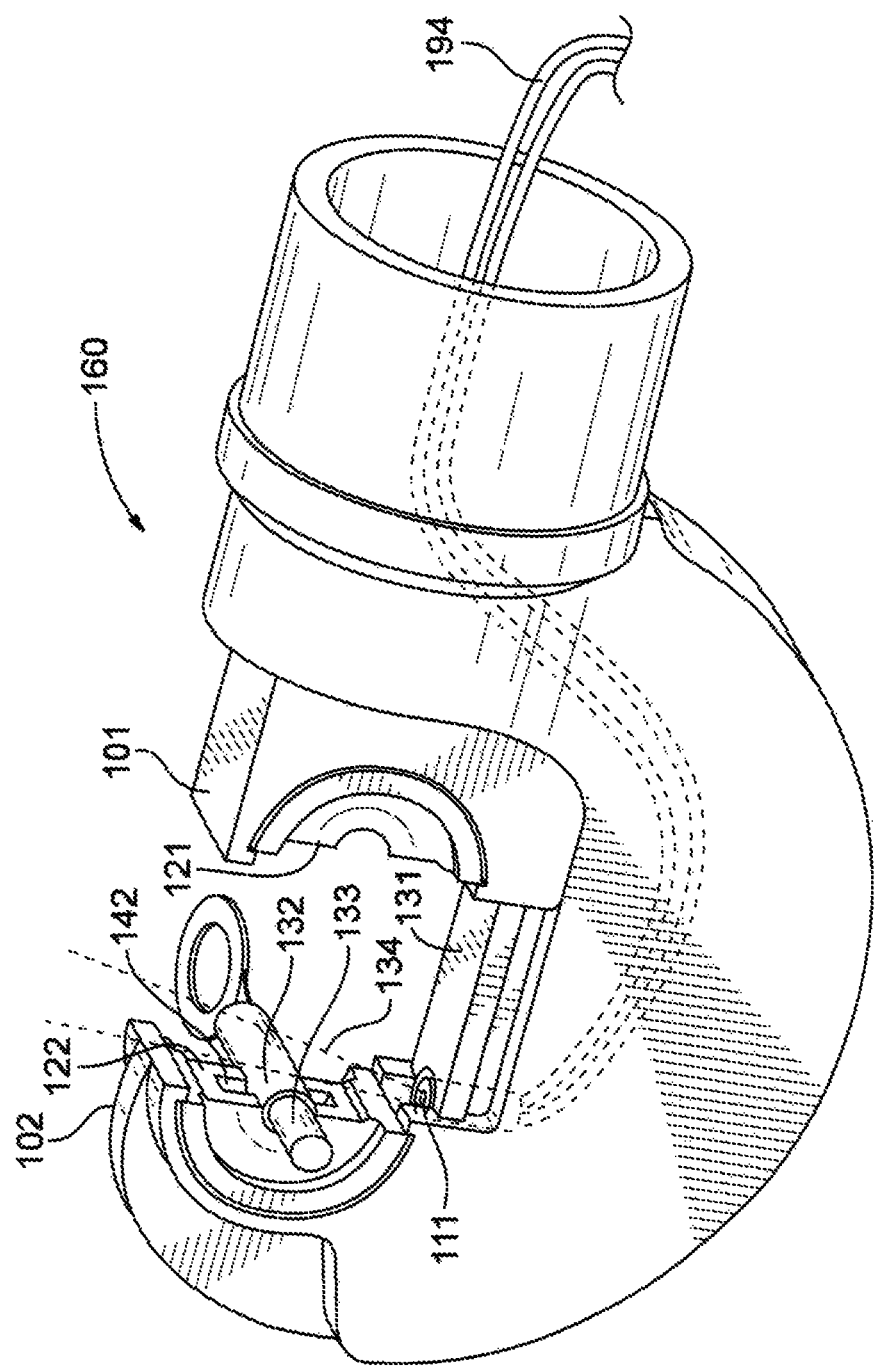
FIG. 2 is a perspective view of an embodiment of a head for performing a crimping operation.

FIG. 1 illustrates one embodiment of a crimping tool 150 having a body and a head. The head 160 that includes a member 101 and a member 102. The member 101 and the member 102 are configured to converge around an object, seen in for example FIG. 2, positioned between the member 101 and the member 102. The member 102 is fixed and the member 101 moves along a track 131 towards the member 102 around the object positioned between the member 101 and the member 102. In some embodiments, both the member 101 and the member 102 move towards each other to converge around the object positioned between the member 101 and the member 102. In some embodiments, the object is a wire or cable inserted through a sleeve of a lug or connector, as shown in FIG. 2.

A die 121 is attached to the member 101 and a die 122 is attached to the member 102. The dies have physical features such as protrusions and grooves that are applied to the object when the members converge around the object. When the object is a wire inserted into the sleeve of a connector, this operation crushes the sleeve of the connector onto the wire thereby securing the connector to the wire facilitating the maintenance of an electrical connection between the connector and the wire.

The member 102 is in a fixed position on the crimping tool 150. When a button 192 is pressed, the member 101 is propelled towards the member 102 using a force generated by power supplied from a battery 190. Thus, the member 101 approaches the member 102 guided on a track 131 to converge around the object. The means of applying a force on the member 101 is within the crimping tool 150 and is not shown or described. It will be apparent to one skilled in the art that conventional methods may be used to propel the member 101. In some cases, a motor powered by the battery 190 propels the member 102. In some embodiments, the members may converge by manual force applied to the members by squeezing handles together.

An embedded laser 111 is mounted near the part of the track 131 where the member 101 and the member 102 converge around an object. The embedded laser 111 receives power from a battery 190 via power lines 194, and is positioned laterally to generate light 134 in the plane through which features of the member 101 and/or the member 102 traverse to converge on the object. In some cases, the embedded laser 111 generates a narrow beam of light to indicate a particular position that is aligned with a feature or a corresponding portion of the member. This beam of light indicates where the feature will interact with the object to facilitate positioning of the object in advance of performing the operation. In other cases, the laser generates light that has an angular spread to illuminate a region in a plane in which a feature of the member 101 traverses. In some embodiments, the feature of the member 101 is an integral portion of the member 101. In other embodiments, the feature of the member 101 is on the die 121 that is attached to the member 101.

FIG. 2 illustrates the head 160 of the crimping tool 150 of FIG. 1. The head 160 includes a member 101 including a die 121 with a feature 141, seen in FIG. 4 and a member 102 including a die 122 with a feature 142. The die 121 and the die 122, including the feature 141 and the feature 142, are identical. However, in other embodiments, the dies and features may be different from each other.

The embedded laser 111 is positioned to generate a light 134 in the plane of the traversal path of the feature 141 as the member 101 is propelled along the track 131 towards the member 102 around the connector 132 having a sleeve around a wire 133.

An object, e.g., connector 132, having a sleeve placed around a wire 133 is positioned in the gap between the member 101 and the member 102 substantially perpendicular to the traversal path of one or both members. The features of the die 121 and the die 122 determine the forces applied to the connector 132 around the wire 133 thereby securing the connector 132 to the wire 133.

The light from the embedded laser 111 illuminates the connector 132 at the location where at least one feature of at least one member is expected to impact the connector as the member 101 approaches the member 102. In other embodiments, both members move towards each other to converge around the object and the laser illuminates a position or a plane through which at least one feature from either or both members traverse. In yet other embodiments, three or more members converge on the object. In still other embodiments, two or more lasers are used for alignment. For example, additional lasers may be used to align additional features of the members to other points on the object.

Figure 3:
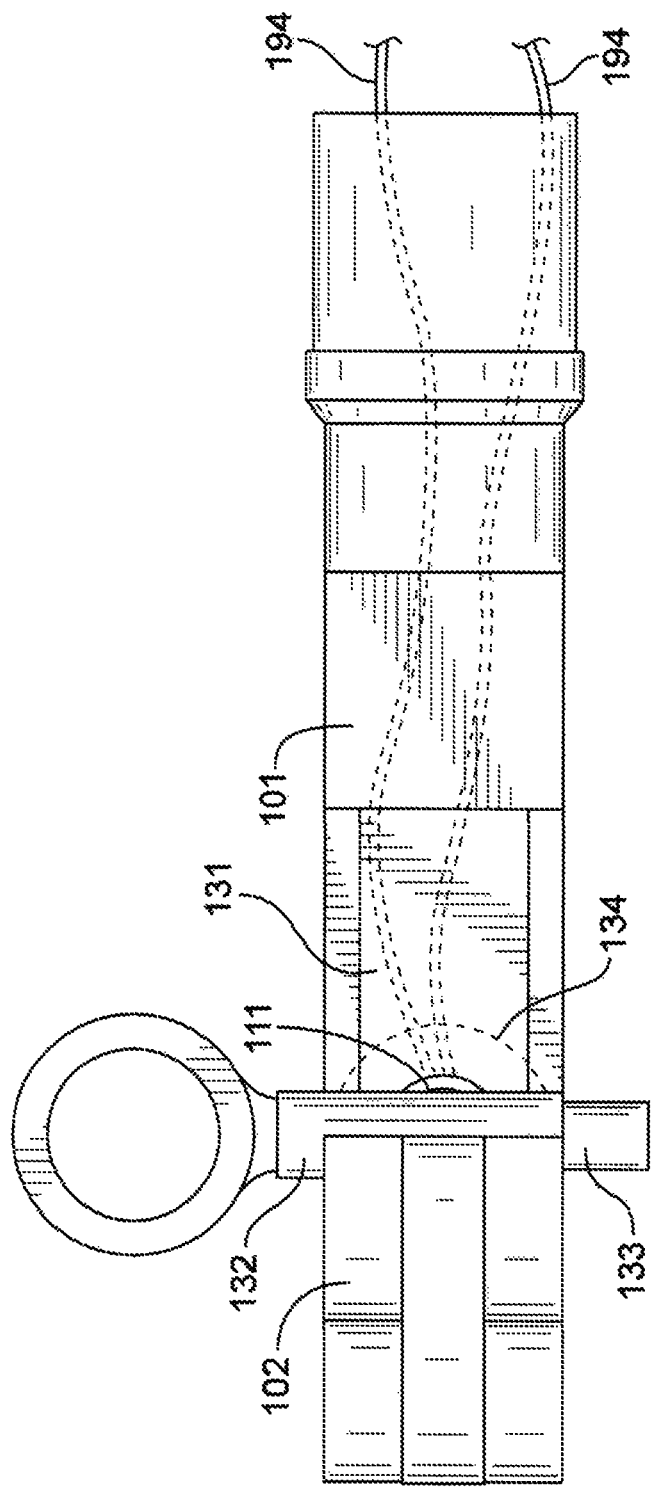
FIG. 3 is a top view of an embodiment of a head for performing a crimping operation.

FIG. 3 is a top view of the head 160 of the crimping tool 150. The head 160 of the crimping tool 150 includes the member 101 that slides along a track 131 to approach the member 102 when the button 192 (shown in FIG. 1) on the body of the crimping tool 150 is pressed.

The connector 132 having a sleeve around a wire 133 is positioned substantially perpendicular to a plane between the member 101 and the member 102 and above the embedded laser 111. The embedded laser 111 generates light 134 having an angular spread to illuminate a region in the plane through which the features of the member 101 traverses to converge around the sleeve of the connector 132. The embedded laser 111 receives power on the power line 194.

Figure 4:
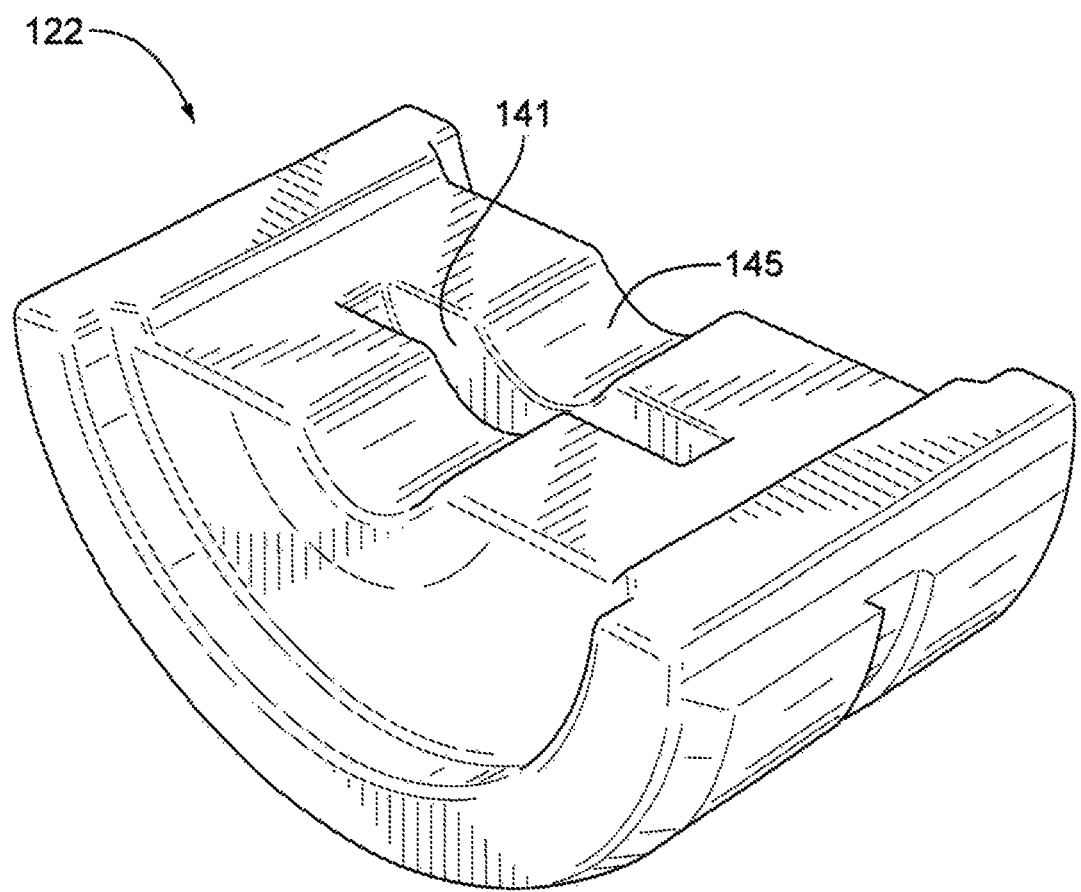
FIG. 4 is a view of an embodiment of a die for the crimping tool of FIG. 1.

FIG. 4 illustrates a die 122. The die has a feature 145 and a feature 141. The feature 145 is a semicircular groove sized to accommodate along its length the sleeve of the connector 132 around the wire 133. The die 121, seen in FIG. 2, is identical to the die 122. When the two die come together around the connector 132 as the members converge, the feature 145 for each die crushes the connector around the wire. The feature 141 is a groove perpendicular to the feature 145. The feature 141 causes discontinuities in the shape of the crushed connector. This helps prevent the connector 132 from sliding off the wire 133.

Figure 5:
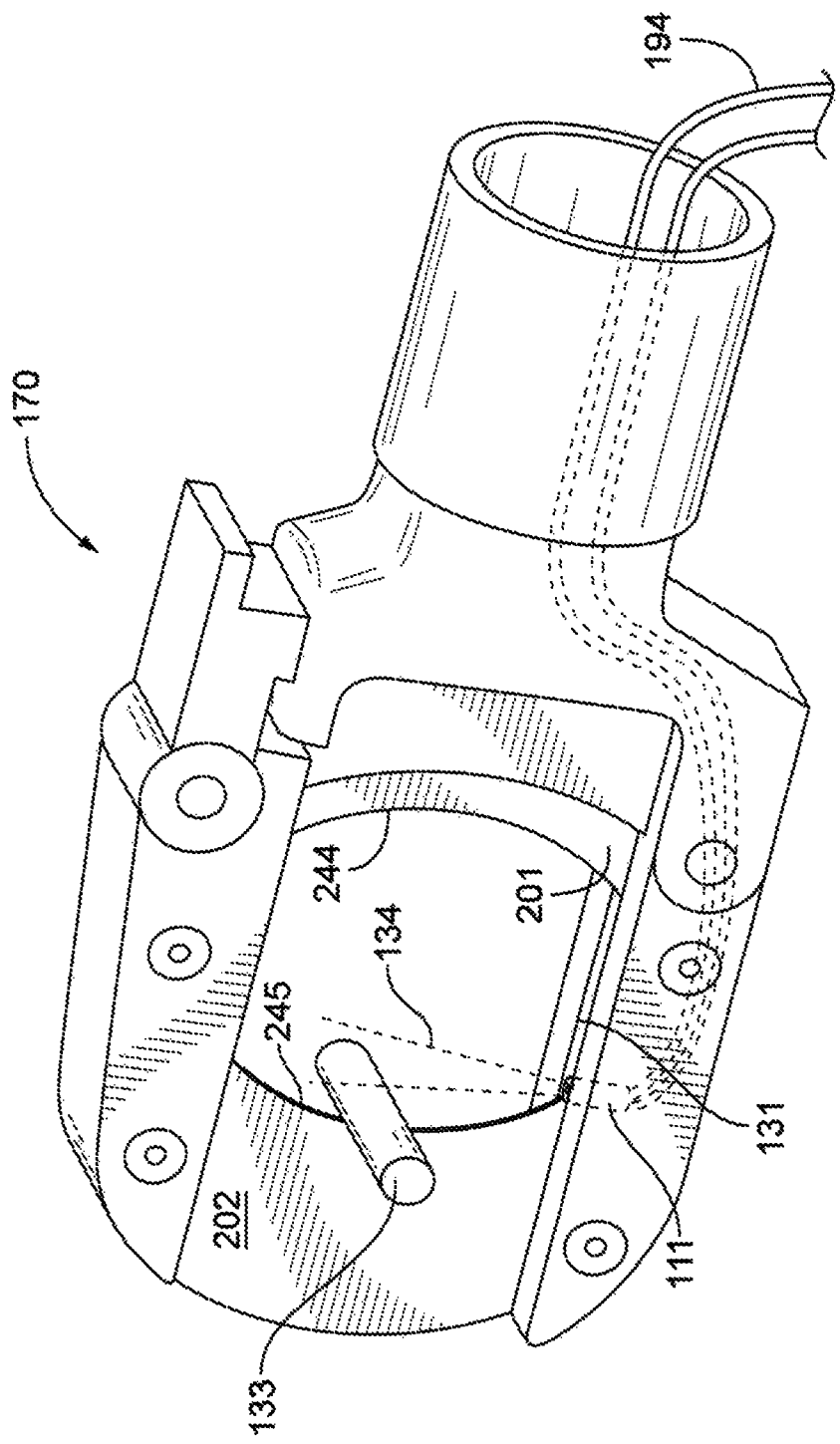
FIG. 5 is a perspective view of an embodiment of a head for performing a cutting operation.

FIG. 5 illustrates a head 170 of a cutting tool. The head 170 includes a member 201 with a feature that is a blade 244 and a member 202 with a feature that is a blade 245. The embedded laser 111 is positioned to generate light 134 in the plane of the traversal path of the blade 244 as the member 201 is propelled along the track 131 to converge with the member 202. This light 134 provides a visual indication of where the blade 244 and the blade 245 will converge around the wire 133. When the blade 244 and the blade 245 converge, the blade 245 and the blade 244 cut the wire 133. Power line 194 is connected to embedded laser 111 and battery 190 as noted above.

In some embodiments, the head 170 interfaces with a body of the cutting tool that is similar to the body of the crimping tool in that it provides power to the embedded laser 111 and has components that propel the member 201 when a button, e.g., button 192 shown in FIG. 1, is pressed.

Figure 6:
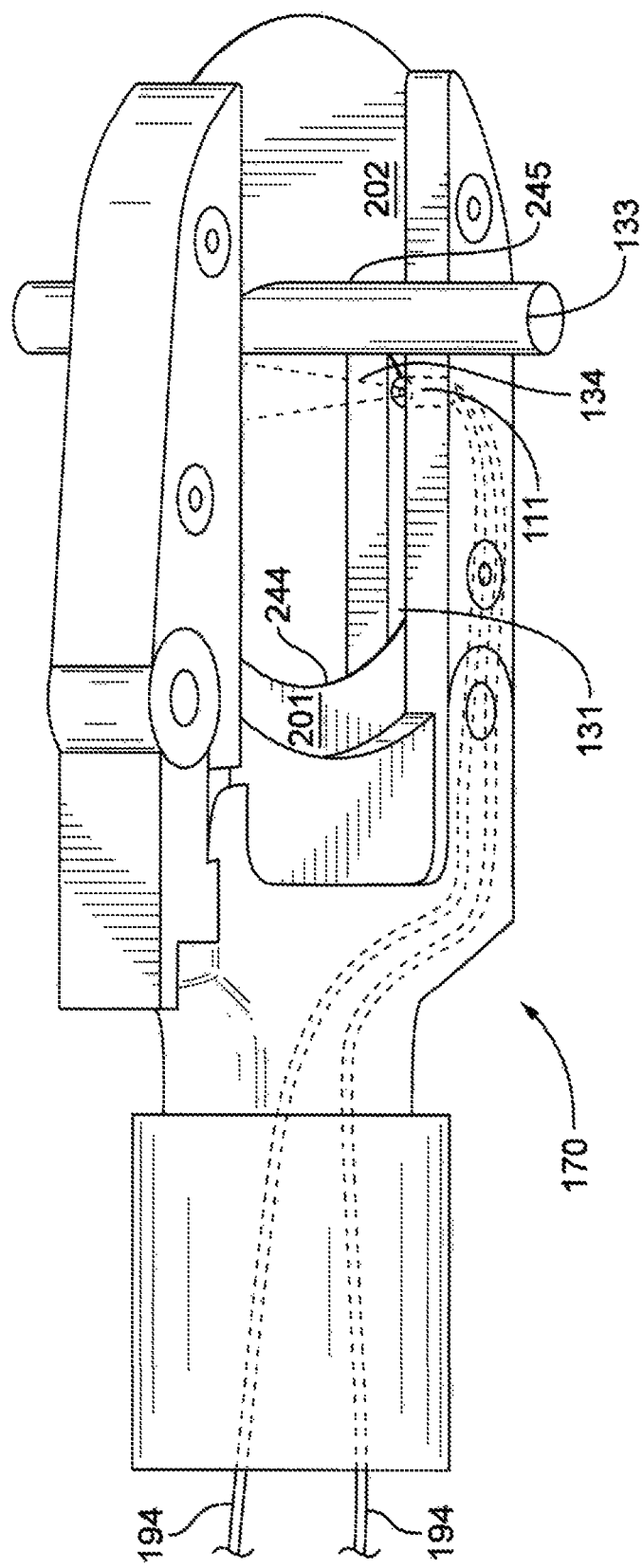
FIG. 6 is a top view of an embodiment of a head for performing a cutting operation.

FIG. 6 is a top view of the head 170 of the cutting tool. The wire 133 is positioned substantially perpendicular to the plane between the member 201 and the member 202 and above the embedded laser 111. The embedded laser 111 receives power on the power line 194 and generates light 134 having an angular spread to illuminate a region in the plane through which the blade 244 of the member 201 traverses to cut the wire 133.

Figure 7:
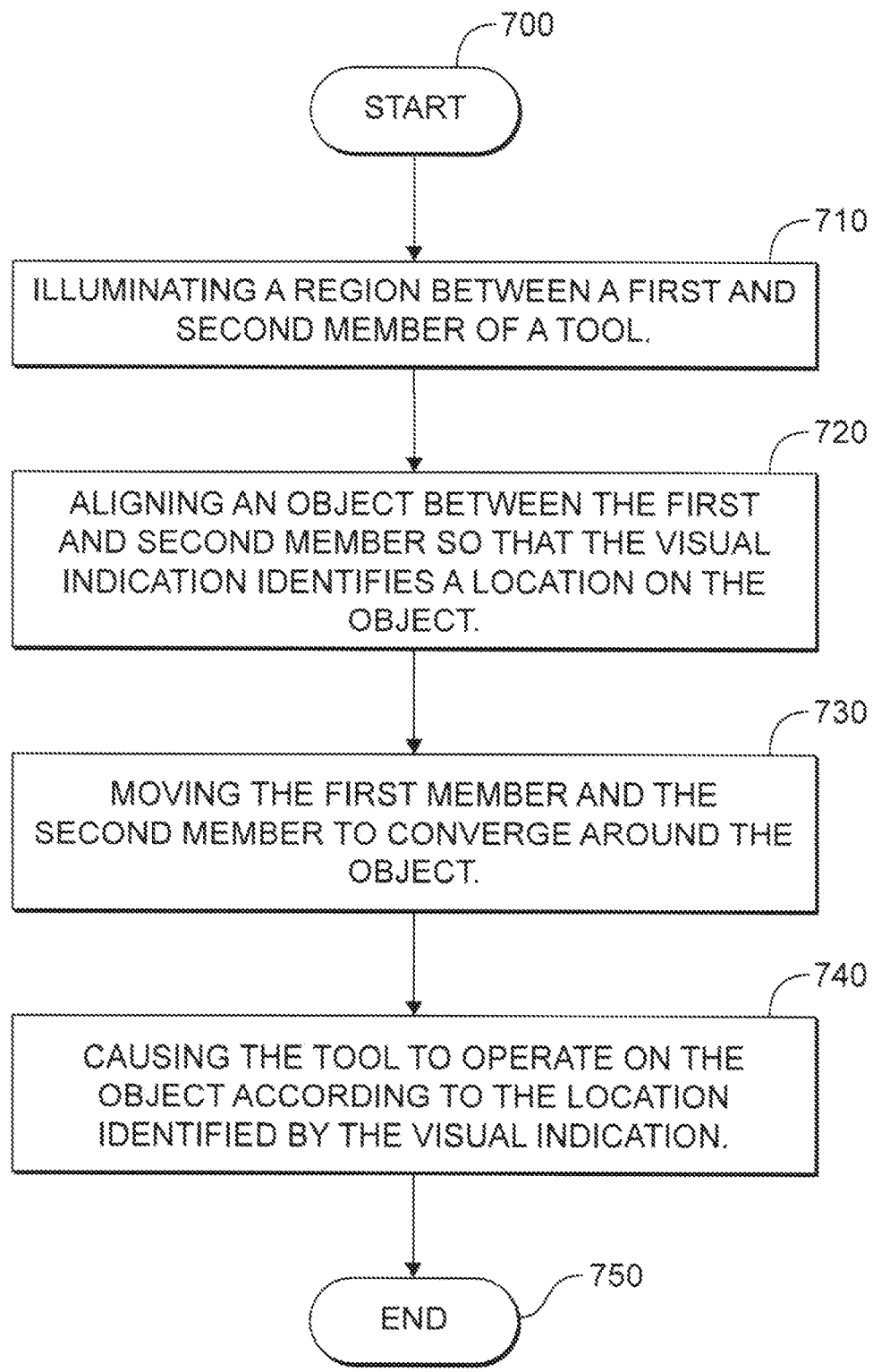
FIG. 7 is a flow chart of a method for performing a laser guided operation on an object.

FIG. 7 is a flow chart of a method for using a tool to perform a laser-guided operation. In step 700 the method starts. A region between the first and second members of a tool is then illuminated by the laser 111 when the button 192 is pressed, step 710. With the region illuminated, an object is aligned between the first and second members so that the visual indication identifies a location on the object, step 720. In step 730, the first and second members are moved to converge around the object by further pressing button 192. The first and second members then cause the tool to operate on the object according to the location identified by the visual indication, step 740. The method ends in step 750.

In some embodiments, the object is a connector with a sleeve around a wire and the operation crimps the sleeve at the location identified by the visual indication. In other embodiments, the object is a wire and the operation cuts the wire at the location identified by the visual indication. Other objects and physical operations may be performed by the tool.

The foregoing specification provides a description with reference to specific exemplary embodiments. The specification and drawings are to be regarded in an illustrative sense rather than a restrictive sense. Various modifications may be made thereto without departing from the spirit and scope as set forth in the following claims.

What is claimed is:

1. A tool head for operating on an object, the tool head comprising:
   a first member and a second member, at least one of the first and second member being configured to move toward the other member along a track; and
   a light source positioned along the track to provide a visual indication where the first and second members are to interact with the object as the at least one member moves toward the other member.

2. The tool head according to claim 1, wherein the first and second members are configured to crimp the object as the first member moves toward the second member.

3. The tool head according to claim 1, wherein the first and second members are configured to cut the object as the first member moves toward the second member.

4. The tool head according to claim 1, wherein the first member has a first feature and the second member has a second feature, and wherein the light source is positioned to generate a narrow beam of light or an angular spread of light that visually indicates a region where at least one of the first feature and the second feature are configured to operate on the object as the at least one member moves toward the other member.

5. The tool head according to claim 1, wherein the light source is positioned to generate light to visually indicate a plane between the first and second members.

6. The tool head according to claim 1, wherein the light source is a laser.

7. The tool head according to claim 1, wherein the first member comprises a first die and the second member comprises a second die.

8. The tool head according to claim 7, wherein the first die comprises a first blade and the second die comprises a second blade, and wherein the light source is positioned to visually indicate where at least one of the first blade and the second blade will operate on the object as the at least one member moves toward the other member.

9. The tool head according to claim 8, wherein the first and second blades are arcuate in shape.

10. The tool head according to claim 7, wherein the first die comprises a first crimping surface and the second die comprises a second crimping surface, and wherein the light source is positioned to visually indicate where at least one of the first blade and the second blade will operate on the object as the at least one member moves toward the other member.

11. The tool head according to claim 10, wherein the first crimping surface comprises at least one of a protrusion and a groove, and wherein the second crimping surface comprises at least one of a protrusion and a groove.

12. A tool head for operating on an object, the tool head comprising:
   a first cutting blade and a second cutting blade, at least one of the first and second cutting blades being configured to move toward the other cutting blade along a track; and
   a light source positioned along the track to provide a visual indication where the first and second cutting blades are to interact with the object as the at least one cutting blade moves toward the other cutting blade.

13. The tool head according to claim 12, wherein the light source is positioned to visually indicate a region where at least one of the first cutting blade and the second cutting blade will operate on the object as the at least one cutting blade moves toward the other cutting blade.

14. The tool head according to claim 12, wherein the light source is positioned to generate a narrow beam of light or an angular spread of light that visually indicates a region where at least one of the first cutting blade and the second cutting blade are configured to operate on the object as the at least one cutting blade moves toward the other cutting blade.

15. The tool head according to claim 12, wherein the first and second cutting blades are arcuate in shape.

16. A tool head for operating on an object, the tool head comprising:
   a first crimping member and a second crimping member, at least one of the first and second crimping members being configured to move toward the other crimping member along a track; and a light source positioned along the track to provide a visual indication where the first and second crimping members are to interact with the object as the at least one crimping member moves toward the other crimping member.

17. The tool head according to claim 16, wherein the light source is positioned to visually indicate a region where at least one of the first crimping member and the second crimping member will operate on the object as the at least one crimping member moves toward the other crimping member.

18. The tool head according to claim 16, wherein the light source is positioned to generate a narrow beam of light or an angular spread of light that visually indicates a region where at least one of the first crimping member and the second crimping member are configured to operate on the object as the at least one crimping member moves toward the other crimping member.

19. The tool head according to claim 16, wherein the light source is a laser.

20. The tool head according to claim 16, wherein the first crimping member comprises at least one of a protrusion and a groove, and wherein the second crimping member comprises at least one of a protrusion and a groove.

* * * * *